(12) United States Patent
Smirnov et al.

(10) Patent No.: US 8,424,033 B2
(45) Date of Patent: Apr. 16, 2013

(54) TURNTABLE DEVICE FOR DETACHABLY SECURING A DISK

(75) Inventors: Viatcheslav Smirnov, Suwon-si (KR); Nam-Seok Kim, Osan-si (KR); Pyo Kim, Suwon-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 952 days.

(21) Appl. No.: 12/081,599

(22) Filed: Apr. 17, 2008

(65) Prior Publication Data
US 2009/0125932 A1    May 14, 2009

(30) Foreign Application Priority Data

Nov. 12, 2007 (KR) .................. 10-2007-0114913

(51) Int. Cl.
*G11B 17/028* (2006.01)
(52) U.S. Cl.
USPC ........................................ 720/714; 720/712
(58) Field of Classification Search ........... 720/695–717
See application file for complete search history.

(56) References Cited

U.S. PATENT DOCUMENTS

| | | | | |
|---|---|---|---|---|
| 4,514,839 A | * | 4/1985 | Eisemann | 720/707 |
| 4,608,681 A | * | 8/1986 | Shiosaki | 720/632 |
| 4,755,981 A | * | 7/1988 | Ekhoff | 720/707 |
| 5,048,005 A | * | 9/1991 | Ekhoff | 720/707 |
| 5,501,760 A | * | 3/1996 | Mukawa | 720/704 |
| 5,917,802 A | * | 6/1999 | Konno | 720/704 |
| 6,072,767 A | * | 6/2000 | Iwazawa | 720/706 |
| 6,363,048 B1 | * | 3/2002 | Wu et al. | 720/707 |
| 2002/0157579 A1 | * | 10/2002 | Bierhoff | 108/20 |
| 2003/0214855 A1 | * | 11/2003 | Sugiyama et al. | 365/200 |
| 2004/0190387 A1 | * | 9/2004 | Ishii et al. | 369/30.03 |
| 2007/0067790 A1 | * | 3/2007 | Van Der Sanden et al. | 720/704 |

FOREIGN PATENT DOCUMENTS

| | | |
|---|---|---|
| JP | 8-96460 | 4/1996 |
| JP | 2000-251360 | 9/2000 |
| KR | 2003-0031850 | 4/2003 |

OTHER PUBLICATIONS

Korean Office Action issued on Mar. 26, 2009 in corresponding Korean Patent Application 10-2007-0114913.

\* cited by examiner

*Primary Examiner* — Nathan Danielsen

(57) ABSTRACT

A turntable device and a disk driving device having the same are disclosed. The turntable device, for detachably securing a disk, may include: a centering part, in an inner perimeter of which slots are formed along a circumferential direction that provide an elastic force; and a base, on which a conical extension part is formed that is configured to slidably support an inner perimeter of the centering part. The turntable device can improve alignment between the centers of rotation of the motor and the disk, even for high-speed rotations.

16 Claims, 15 Drawing Sheets

TURNTABLE DEVICE FOR DETACHABLY SECURING A DISK

CROSS-REFERENCE TO RELATED APPLICATIONS

This application claims the benefit of Korean Patent Application No. 10-2007-0114913 filed with the Korean Intellectual Property Office on Nov. 12, 2007, the disclosure of which is incorporated herein by reference in its entirety.

BACKGROUND

1. Technical Field

The present invention relates to a turntable device and a disk driving device having the turntable device.

2. Description of the Related Art

In general, a disk drive may include a deck base which forms the main body, a means for loading or unloading a disk onto or from the deck base, a means for rotating the disk loaded onto the loading/unloading means at a particular speed, and a means for recording or retrieving information onto or from the recording surface of the disk while traversing across the radius of the disk rotated by the rotating means.

Several types of disk drives are known to the public, examples of which may include disk drives in which a disk is loaded and unloaded while mounted on a tray, or in which a disk is encased in a cartridge that is received into or ejected from the deck base.

A spindle motor may be employed as the means for rotating the disk can be a spindle motor, while a pickup unit may typically be used as the means for recording or retrieving information onto/from the recording surface of the disk. Also, a disk chucking device for securing the disk may be equipped on the deck base, where the disk may be inserted onto the chuck base and secured by chuck chips, etc.

An important matter in such a disk drive is to align the center of the disk mounted on the chuck base with the center of the chuck base itself. If the centers of the chuck base and the disk are misaligned, the high-speed rotation of the disk can further increase the eccentricity between the centers and can cause various vibrations and noise.

In particular, DVD devices equipped with high-capacity storage apparatus such as BD or HD systems require rotations of even higher speeds. In regard to the actions of reading and writing data for these devices, the mechanical strengths of the turntable device and the disk driving device, as well as the center alignment actions, are of critical importance in avoiding errors.

The centering part, which supports the disk in a turntable device, may slide along the rotating shaft of the motor. Here, the length along which the centering part slides may be shorter, compared to the diameter of the supported disk. Also, there are always tolerances between the rotating shaft of the motor and the inner perimeter of the centering part, while the mechanical strength between the centering part and the rotating shaft may not be sufficient to provide satisfactory alignment. As such, there is a risk of errors occurring during reading or writing actions.

SUMMARY

An aspect of the invention provides a turntable device and a disk driving device equipped with the turntable device, in which the alignment between the rotation centers of the motor and the disk is improved, even in high-speed rotations.

Another aspect of the invention provides a turntable device, for detachably securing a disk, which includes: a centering part, in an inner perimeter of which slots are formed along a circumferential direction that provide an elastic force; and a base, on which a conical extension part is formed that is configured to slidably support an inner perimeter of the centering part.

Here, the turntable device may further include a yoke, which may be coupled to the base to prevent the centering part from detaching, and may further include an elastic member, which may be coupled to the base to elastically support the centering part. Here, the elastic member can be a compression coil spring or a rubber ring. A holding part may be formed on the base, in which the centering part may be held.

The outer perimeter of the centering part can be made from multiple adjoining convexly curved surfaces, which can include a first convexly curved surface configured to guide a mounting of the disk, and a second convexly curved surface configured to touch an inner perimeter of the disk to secure the disk. An additional third curved surface may also be included, which can be interposed between the first and second convexly curved surfaces to connect the first and second convexly curved surfaces.

Yet another aspect of the invention provides a turntable device, for detachably securing a disk, which includes: a centering part, which is configured to touch an inner perimeter of the disk, and which has convexly curved surfaces forming its outer perimeter; a base, which supports the centering part, and on which the disk may be mounted; and a yoke, which is coupled to the base such that a magnet is exposed.

Here, the multiple convexly curved surfaces can include a first convexly curved surface configured to guide a mounting of the disk, and a second convexly curved surface configured to touch an inner perimeter of the disk to secure the disk, while a third curved surface may additionally be included, which may be interposed between the first and second convexly curved surfaces to connect the first and second convexly curved surfaces.

Still another aspect of the invention provides a disk driving device that includes: a centering part, in an inner perimeter of which slots are formed along a circumferential direction that are configured to provide an elastic force; a base, on which a conical extension part is formed that is configured to slidably support an inner perimeter of the centering part; and a motor, which transfers a driving force to the base.

Here, the disk driving device may further include a yoke, which may be coupled to the base to prevent the centering part from detaching, and may further include an elastic member, which may be coupled to the base to elastically support the centering part. Here, the elastic member can be a compression coil spring or a rubber ring. A holding part may be formed on the base, in which the centering part may be held.

The outer perimeter of the centering part can be made from multiple adjoining convexly curved surfaces, which can include a first convexly curved surface configured to guide a mounting of the disk, and a second convexly curved surface configured to touch an inner perimeter of the disk to secure the disk. An additional third curved surface may also be included, which can be interposed between the first and second convexly curved surfaces to connect the first and second convexly curved surfaces.

Yet another aspect of the invention provides a disk driving device that includes: a centering part, which touches an inner perimeter of the disk, and in which multiple convexly curved surfaces form its outer perimeter; a base, which supports the centering part, and on which the disk may be mounted; a yoke, coupled to the base such that a magnet is exposed; and a motor, which transfers a driving force to the base.

Here, the multiple convexly curved surfaces can include a first convexly curved surface configured to guide a mounting of the disk, and a second convexly curved surface configured to touch an inner perimeter of the disk to secure the disk, while a third curved surface may additionally be included, which may be interposed between the first and second convexly curved surfaces to connect the first and second convexly curved surfaces.

Additional aspects and advantages of the present invention will be set forth in part in the description which follows, and in part will be obvious from the description, or may be learned by practice of the invention.

BRIEF DESCRIPTION OF THE DRAWINGS

FIG. 11 is a cross-sectional view illustrating a turntable device according to a first disclosed embodiment of the invention, before a disk is mounted on.

FIG. 12 is a cross-sectional view illustrating a turntable device according to a first disclosed embodiment of the invention, after a disk is mounted on.

DETAILED DESCRIPTION

Figure 1:
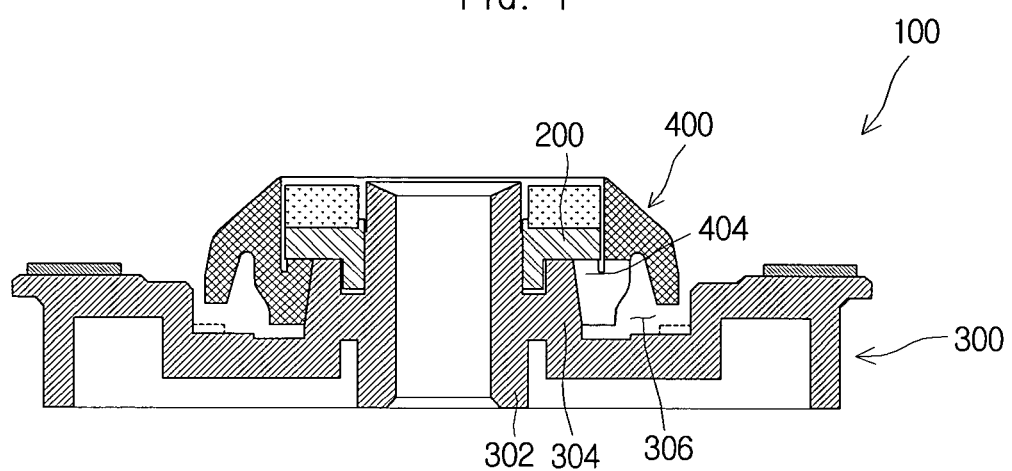
FIG. 1 is a cross-sectional view illustrating a turntable device according to a first disclosed embodiment of the invention.

The turntable device and disk driving device having the turntable device, according to certain embodiments of the invention, will be described below in more detail with reference to the accompanying drawings. Those components that are the same or are in-correspondence are rendered the same reference numeral regardless of the figure number, and redundant explanations are omitted.

FIG. 1 is a cross-sectional view illustrating a turntable device according to a first disclosed embodiment of the invention. In FIG. 1 are illustrated a disk 10, a turntable device 100, a yoke 200, a base 300, a boss 302, an extension part 304, a holding part 306, a centering part 400, slots 402, support parts 404, a first convexly curved surface 410, a second convexly curved surface 412, and a third curved surface 414.

As shown in FIG. 1, a turntable device 100 according to the first disclosed embodiment of the invention may be a device for detachably securing a disk 10, and may include a centering part 400, in an inner perimeter of which multiple slots 402 may be formed along a circumferential direction to provide an elastic force, and a base 300, on which a conical extension part 304 may be formed that slidably supports the inner perimeter of the centering part 400. As such, the turntable device 100 may improve alignment between the rotation centers of the motor and the disk 10, even for rotations of high speeds.

Figure 2:
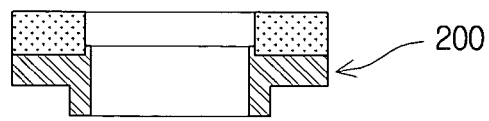
FIG. 2 is a cross-sectional view illustrating a yoke according to a first disclosed embodiment of the invention.

FIG. 2 is a cross-sectional view illustrating a yoke 200 according to the first disclosed embodiment of the invention. As shown in FIG. 2, the yoke 200 may be coupled to the base 300 to prevent the centering part 400 from becoming detached. At one side of the yoke 200, a magnet may be coupled on. The yoke 200 may be coupled onto the uppermost end of the base 300, so that the disk 10 may be placed between the yoke 200 and a clamp (not shown) to secure the disk 10 onto the turntable device 100. Also, the yoke 200 may be coupled to the upper end of a boss 302 formed in the base 300, to serve as a stopper, by limiting the sliding of the centering part 400 and preventing the centering part 400 from detaching from the base 300.

Figure 3:
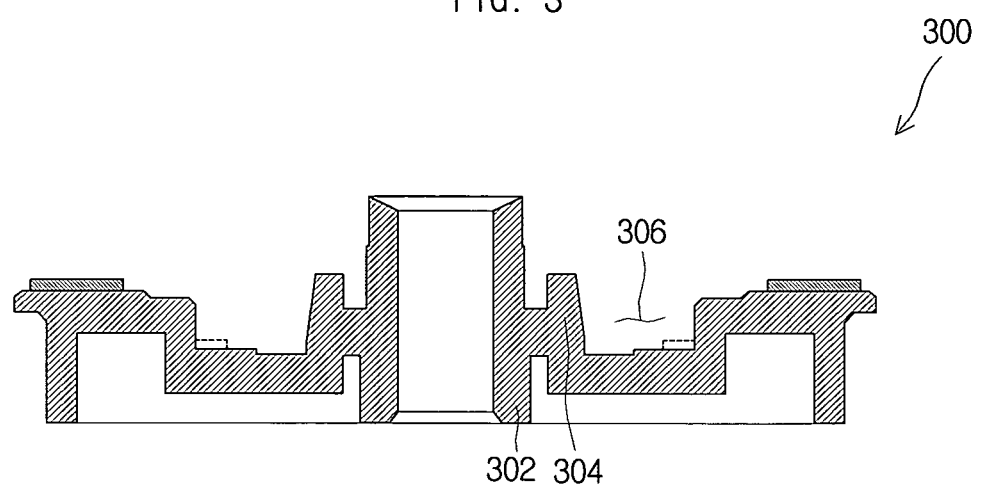
FIG. 3 is a cross-sectional view illustrating a base according to a first disclosed embodiment of the invention.

FIG. 3 is a cross-sectional view illustrating a base 300 according to the first disclosed embodiment of the invention. As shown in FIG. 3, a conical extension part 304 can be formed in the base 300 to support the inner perimeter of the centering part 400 in a manner that allows the centering part 400 to undergo a sliding movement. The disk 10 may be mounted on the base 300, in the center of which the boss 302 may be formed. The boss 302 may be coupled with the rotating shaft of a motor to receive the driving force provided by the motor. The conical extension part 304 can be formed on an outer perimeter of the boss 302, where the extension part 304 can have a conical shape. The extension part 304 may slidably support the centering part 400 while being in contact with the inner perimeter of the centering part 400.

A holding part 306 may be formed in the base 300 in which the centering part 400 may be held. The holding part 306 can be formed on a surface of the base 300 adjacent to the boss 302. By having the holding part 306 hold the centering part 400, the overall thickness of the turntable device 100 can be reduced, allowing a generally thinner turntable device 100. Also, the depth of the holding part 306 may be adjusted, in order to control the length of centering part 400 protruding out from a disk 10 when the disk 10 is mounted on the turntable device 100. A surface on which to mount the disk 10 can be formed on the outer side of the base 300, by which to support the disk 10.

Figure 4:
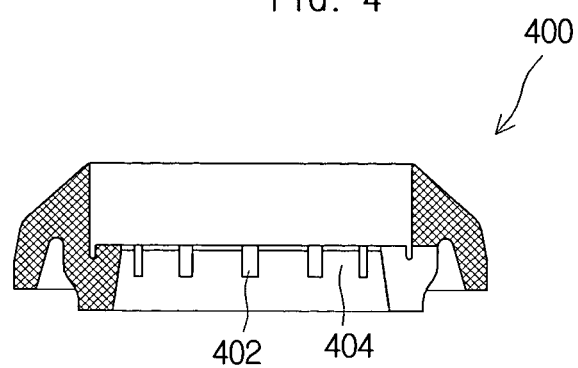
FIG. 4 is a cross-sectional view illustrating a centering part according to a first disclosed embodiment of the invention.
Figure 5:
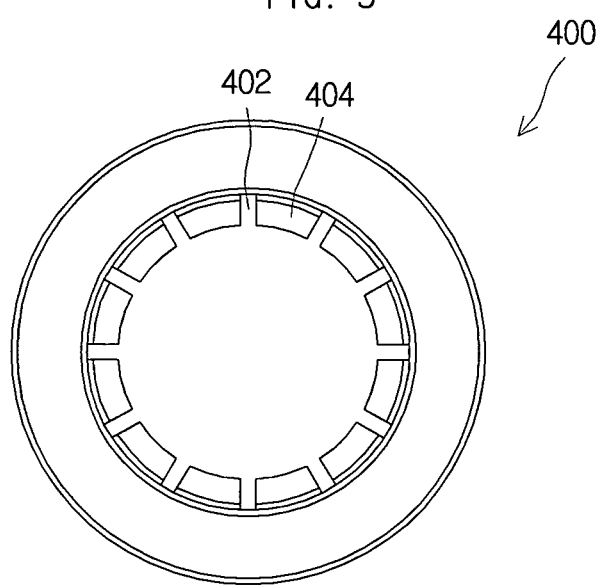
FIG. 5 is a plan view illustrating a centering part according to a first disclosed embodiment of the invention.
Figure 6:
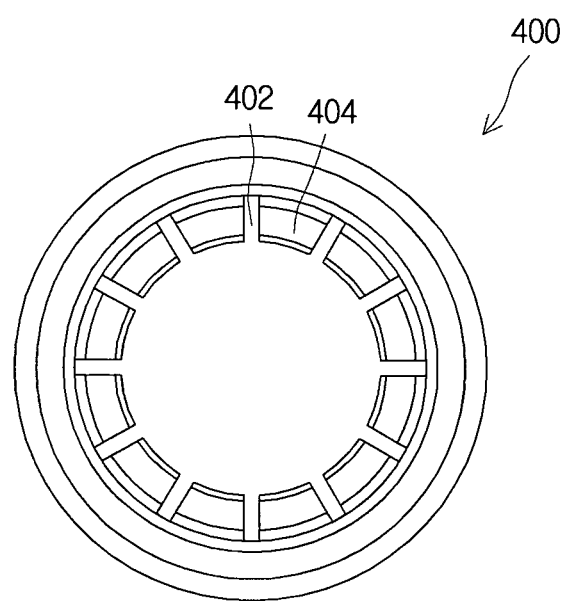
FIG. 6 is a bottom view illustrating a centering part according to a first disclosed embodiment of the invention.

FIG. 4 is a cross-sectional view illustrating a centering part 400 according to the first disclosed embodiment of the invention, FIG. 5 is a plan view illustrating a centering part 400 according to the first disclosed embodiment of the invention, and FIG. 6 is a bottom view illustrating a centering part 400 according to the first disclosed embodiment of the invention.

As shown in FIGS. 4 to 6, more than one slots 402 can be formed in the inner perimeter of the centering part 400 along a circumferential direction, in a configuration that provides an elastic force. The inner perimeter of the centering part 400 may be the portion by which the centering part 400 undergoes a sliding motion while maintaining contact with the conical extension part 304 of the base 300 described above. By forming the slots 402 in the inner perimeter of the centering part 400, support parts 404 may be formed in-between the slots 402. The support parts 404 serve as the portions touching the extension part 304 for sliding, while providing an elastic force to the centering part 400. Each support part 404 can press the extension part 304 inwards, to support the centering part 400 in a manner that allows the centering part 400 to rise along the conical outer perimeter of the extension part 304. Thus, the centering part 400 may be able to slide up and down along the base 300 by itself.

Also, because the inner perimeter of the centering part 400 may have the support parts 404 pressing against the conical extension part 304, there may be no separation between the centering part 400 and the extension part 304. As such, in the turntable device 100 according to this embodiment, the tilting stiffness of the centering part 400 may be improved, whereby the disk 10 can be rotated with its center aligned.

Figure 7:
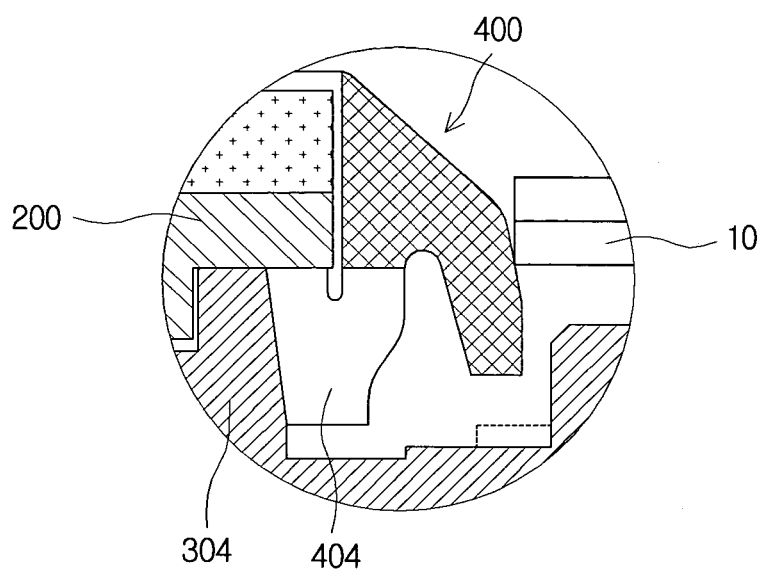
FIG. 7 is a partial cross-sectional view illustrating a turntable device according to a first disclosed embodiment of the invention.
Figure 8:
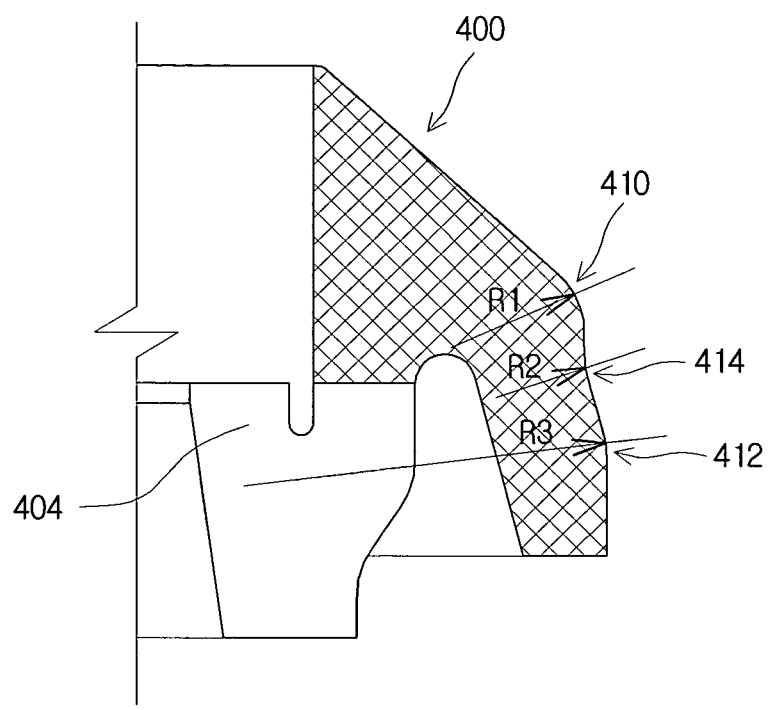
FIG. 8 is a partial cross-sectional view illustrating a centering part according to a first disclosed embodiment of the invention.

FIG. 7 is a partial cross-sectional view illustrating a turntable device 100 according to the first disclosed embodiment of the invention, and FIG. 8 is a partial cross-sectional view illustrating a centering part 400 according to the first disclosed embodiment of the invention. To prevent the shaking of the center of the disk 10 being rotated in the turntable device 100, it is important not only to align the centers of the base 300 and the centering part 400, as described above, but also to align the centers of the disk 10 and the centering part 400. As shown in FIG. 7, the outer perimeter of a centering part 400 according to this embodiment can be provided with convexly curved surfaces.

The first convexly curved surface 410 can be the portion which may, when the disk 10 is mounted onto the base 300, guide the disk 10 such that the centering part 400 may be inserted through the inner perimeter of the disk 10. The second convexly curved surface 412 can be the portion that maintains contact with the inner perimeter of the disk 10 to secure the disk 10 to the base 300. The first and second convexly curved surfaces 410, 412 can be connected by a third curved surface 414. While there may be slight differences in the diameter of the inner perimeter of the disk 10, to be from 15.0 to 15.15 mm, for example, the multiple convexly curved surfaces may still secure the disk 10 to the centering part 400 in a stable manner.

Figure 9:
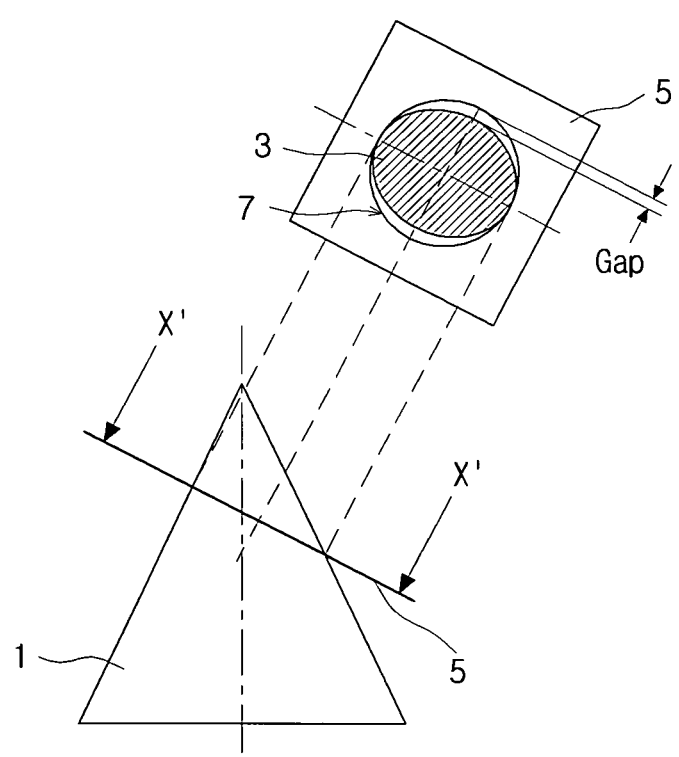
FIG. 9 is a diagram illustrating the operation principle of a conventional centering part.
Figure 10:
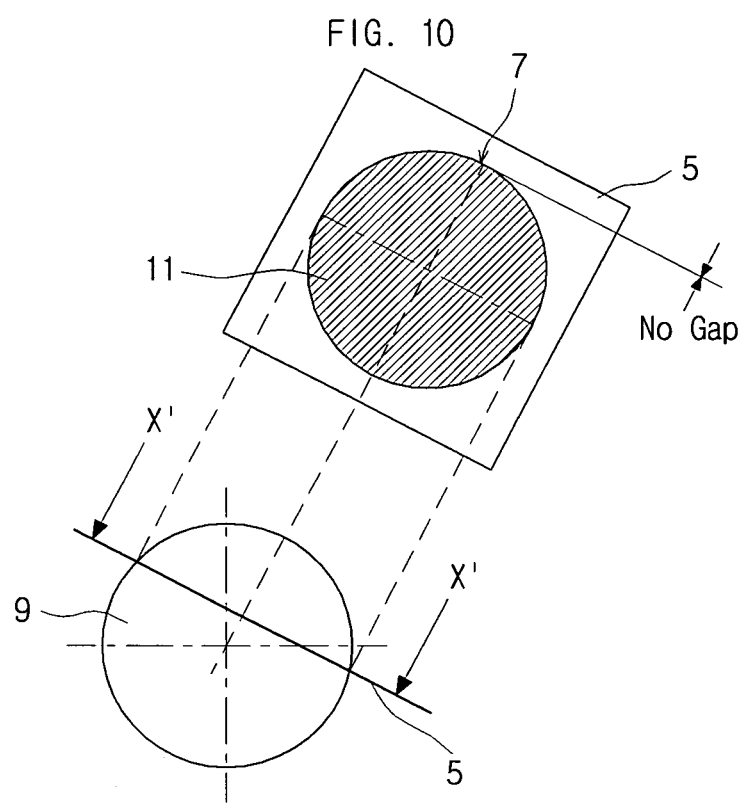
FIG. 10 is a diagram illustrating the operation principle of a centering part according to a first disclosed embodiment of the invention.

FIG. 9 is a diagram illustrating the operation principle of a conventional centering part, while FIG. 10 is a diagram illustrating the operation principle of a centering part 400 according to the first disclosed embodiment of the invention. As shown in FIG. 9, if a cone 1 is cut across a slanted plane 5, the cross section 3 will contact a circle 7 in the slanted plane 5 at two points only. From this, it can be inferred that when a disk 10 is placed in a slanted manner onto the outer perimeter of a centering part that has a conical shape, the disk 10 will be supported by the centering part 400 at two points only. This may cause tilting oscillations during high-speed rotations, making it difficult to align the center of the disk 10.

However, as shown in FIG. 10, if a sphere 9 is cut across a slanted plane 5, the cross section 11 will always form a circle, providing line contact with a circle 7 in the slanted plane 5. From this, it can be inferred that a disk 10 placed onto a convexly curved surface, which may form a portion of a sphere, may be put in line contact with the outer perimeter of the centering part 400 according to this embodiment, and that there may be no gaps between the disk 10 and the centering part 400. As such, the tilting stiffness may be improved, and the tilting oscillations may be reduced.

Figure 11:
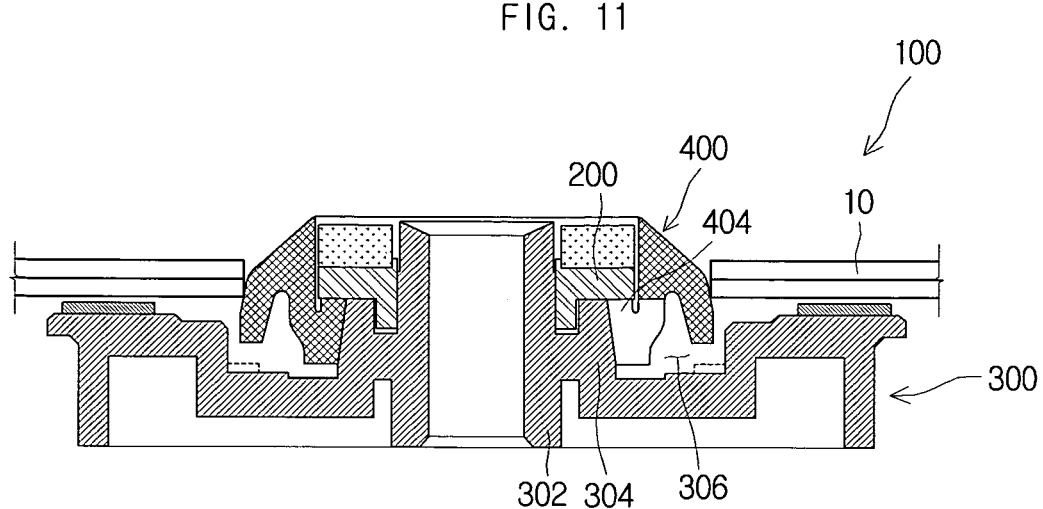
Figure 12:
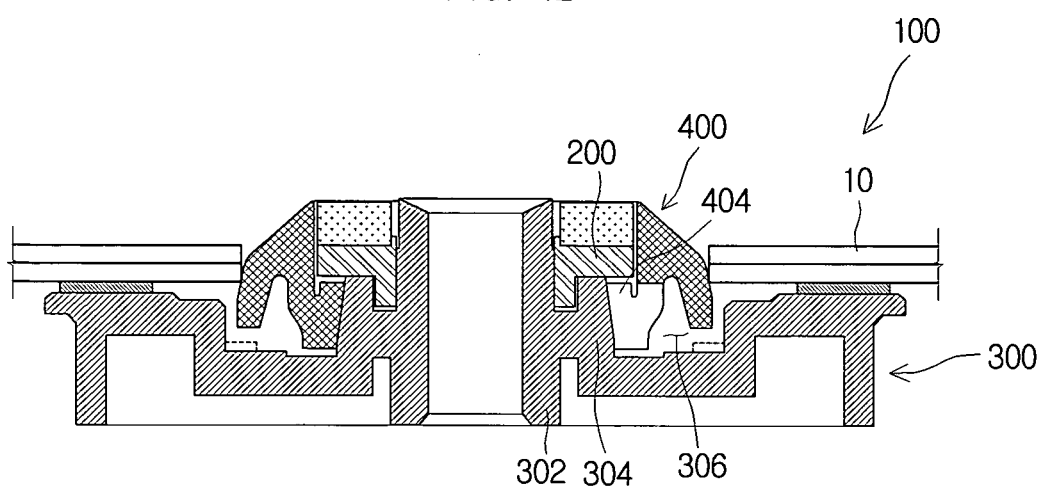

FIG. 11 is a cross-sectional view illustrating a turntable device 100 according to the first disclosed embodiment of the invention before a disk 10 is mounted on, while FIG. 12 is a cross-sectional view illustrating the turntable device 100 according to the first disclosed embodiment of the invention after a disk 10 is mounted on. As illustrated in FIG. 11, before the disk 10 is secured to the turntable device 100, the centering part 400 may be positioned at the upper end of the extension part 304, due to the elastic force of the support part 404 formed on the inner perimeter of the centering part 400. The yoke 200 may be coupled between the extension part 304 and the boss 302 to prevent the centering part 400 from becoming detached. As the disk 10 approaches the centering part 400, the inner perimeter of the disk 10 may be guided along the first convexly curved surface 410 for insertion. As shown in FIG. 12, when the disk 10 is mounted, the inner perimeter of the centering part 400 may descend along the outer perimeter of the extension part 304. At the same time, the second convexly curved surface 412 may enter through the inner perimeter of the disk 10, to be put in line contact with the inner perimeter of the disk 10, so as to secure the disk 16 to the centering part 400.

Figure 13:
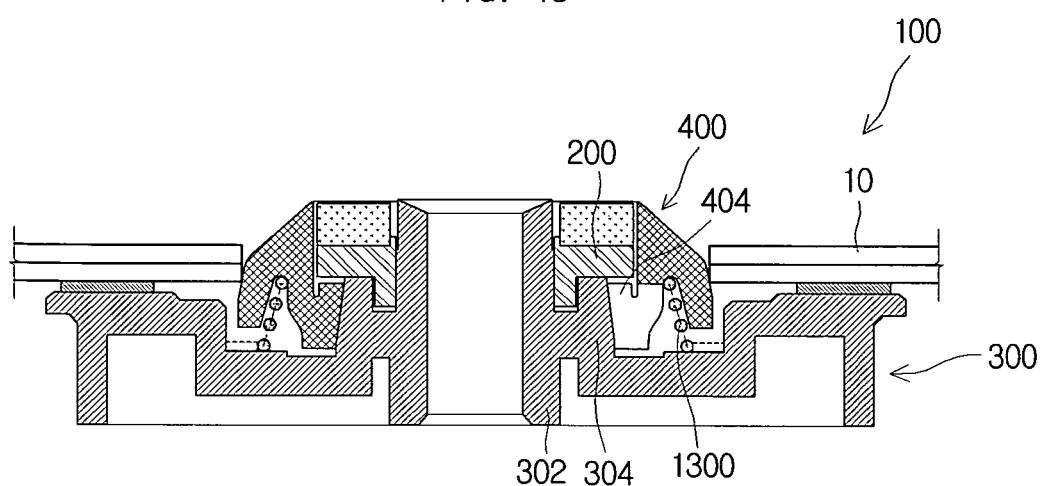
FIG. 13 is a cross-sectional view illustrating a turntable device according to a second disclosed embodiment of the invention.

FIG. 13 is a cross-sectional view illustrating a turntable device 100 according to a second disclosed embodiment of the invention. As illustrated in FIG. 13, a turntable device 100 according to this embodiment may further include an elastic member 1300 coupled to the base 300 to elastically support the centering part 400. Placing the elastic member 1300 between the centering part 400 and the base 300 can further increase the elastic forces that push the centering part 400 upwards. The elastic member 1300 can be a compression coil spring. One end of the compression coil spring can be coupled to the bottom of the centering part 400, while the other end can be coupled to the holding part 306 of the base 300.

Figure 14:
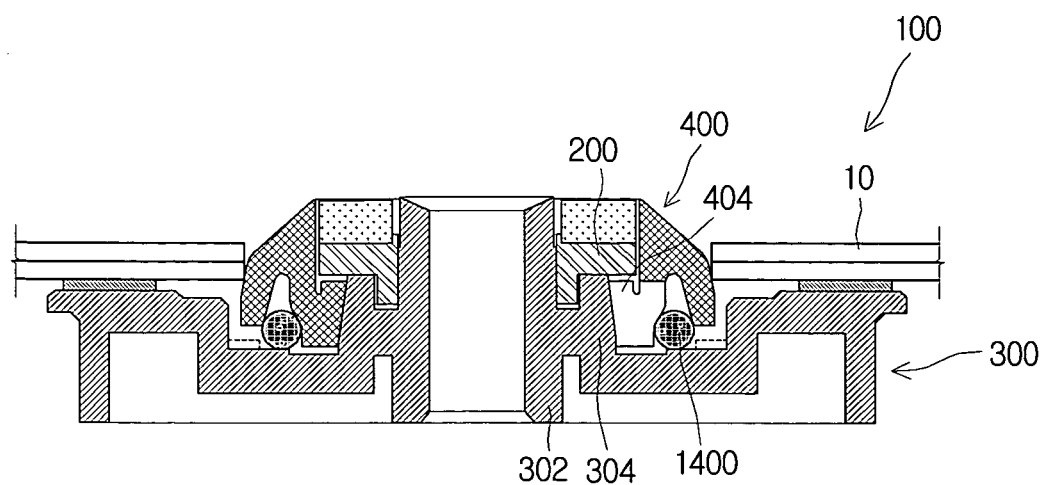
FIG. 14 is a cross-sectional view illustrating a turntable device according to a third disclosed embodiment of the invention.

FIG. 14 is a cross-sectional view illustrating a turntable device 100 according to a third disclosed embodiment of the invention. As shown in FIG. 14, in the turntable device 100 based on this embodiment, the elastic member 1400 can be a rubber ring. The rubber ring can have an annular shape, and can be made of a material having elasticity, such as rubber. The rubber ring may be placed between the centering part 400 and the base 300, to further strengthen the elastic forces that push the centering part 400 upwards.

Figure 15:
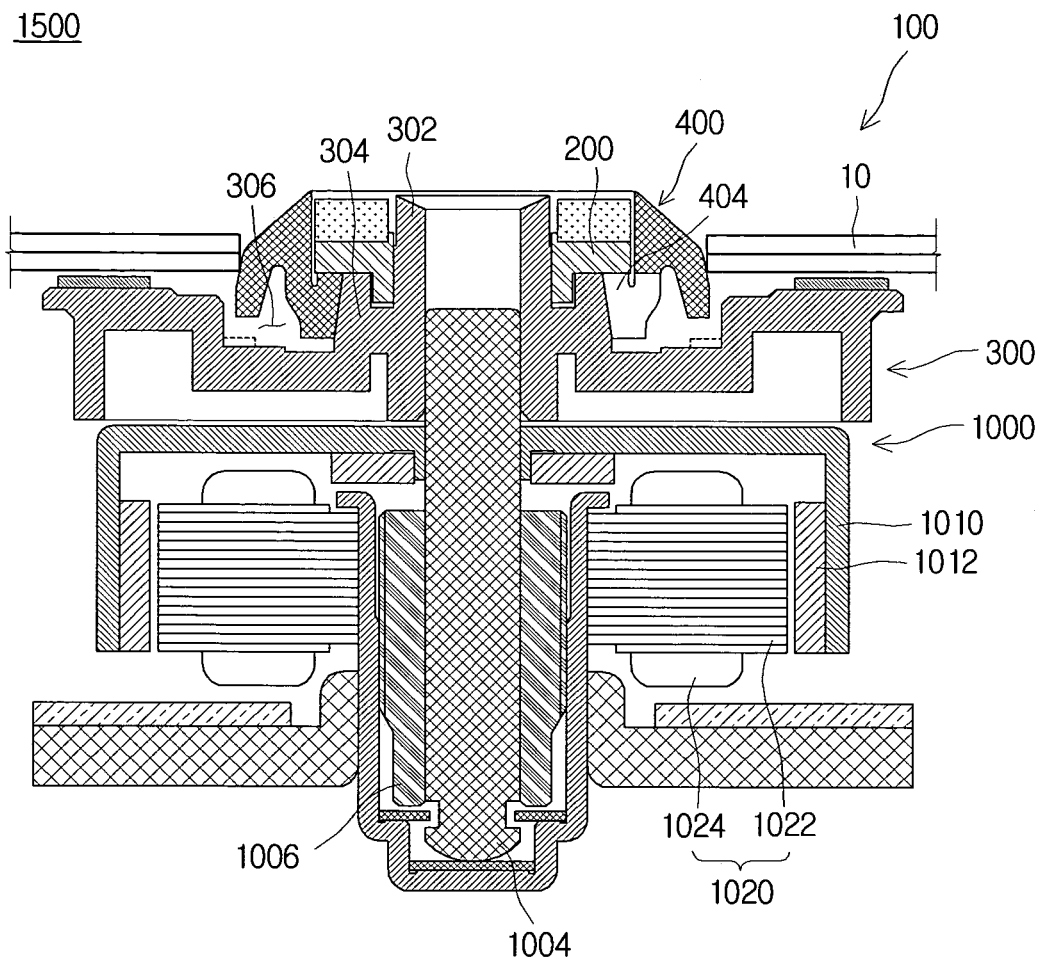
FIG. 15 is a cross-sectional view illustrating a disk driving device according to a fourth disclosed embodiment of the invention.

FIG. 15 is a cross-sectional view illustrating a disk driving device 1500 according to a fourth disclosed embodiment of the invention. In FIG. 15 are illustrated a motor 1000, a rotating shaft 1004, a sleeve 1006, a rotor 1010, magnets 1012, teeth 1022, coils 1024, a stator 1020, and a disk driving device 1500. A disk driving device 1500 according to this embodiment can be a device for driving a disk 10, and can include a centering part 400, in an inner perimeter of which slots 402 may be formed along a circumferential direction to provide an elastic force; a base 300, on which a conical extension part 304 may be formed that slidably supports the inner perimeter of the centering part 400; and a motor 1000, which transfers a driving force to the base 300. Also, multiple convexly curved surfaces can be formed in an adjoining configuration.

As shown in FIG. 15, the disk driving device 1500 may include a turntable device 100, onto which a disk 10 may be inserted and secured, as well as a motor 1000, which may provide a driving force to the turntable device 100. The motor 1000 can be a device for providing a driving force to the turntable device 100, and can be divided mainly into a rotor 1010, which may be coupled to the turntable device 100 to rotate together with the turntable device 100, and a stator 1020, which may provide a rotational force to the rotor 1010.

The stator 1020 may include teeth 1022 secured to a core, and coils 1024 secured around the perimeters of the teeth 1022. At an inner part of the teeth 1022, a sleeve 1006 may be included, which may support a rotating shaft 1004 and allow smoother rotation. An electric current can be inputted to the coils 1024, whereby an electrical field may be formed. The coils 1024 can be arranged adjacent to magnets 1024, which may be affixed to the rotor 1010. The rotating shaft 1004 may rotate together with the rotor 1010 and may serve to transfer the rotational force to the turntable device 100.

The rotor 1010 may rotate together with the rotating shaft 1004 and the turntable device 100, and may have a generally circular horizontal cross section. The rotor 1010 may be open downwards, and may include a cover portion that may be in contact with the turntable device 100. The cover portion can generally be shaped as a circular plate, and an upper surface of the cover portion may be in contact with the turntable device 100.

The rotating shaft 1004 may be inserted through the cover portion, while the boss 302 of the turntable device 100 may be inserted on and secured to the outer side of the insertion portion. In this way, the driving force of the rotating shaft 1004 may be transferred to the turntable device 100.

The turntable device 100 that forms a part of the disk driving device 1500 based on this embodiment of the invention can have substantially the same composition and can share substantially the same technical features as those of the turntable device 100 based on the previously described embodiments of the invention.

Thus, with the disk driving device 1500 according to this embodiment, slots 402 may be formed in the inner perimeter of the centering part 400, with the support parts 404 thus formed providing an elastic force to the centering part 400 and preventing gaps between the centering part 400 and the extension part 304, to improve tilting stiffness and thereby allow rotation with the centers of the disk driving device 1500 and the disk 10 aligned. Also, the convexly curved surfaces formed on the outer perimeter of the centering part 400 can be put in line contact with the inner perimeter of the mounted disk 10, to thereby suppress the occurrence of tilting oscillations and further improve the aligning of the center of the disk 10.

In addition, the disk driving device 1500 according to this embodiment can include some or all of the technical features and the resulting effects of the turntable device 100 according to the previously described embodiments.

As set forth above, embodiments of the invention can improve alignment between the centers of rotation of the motor and the disk, even for high-speed rotations.

While the spirit of the invention has been described in detail with reference to particular embodiments, the embodiments are for illustrative purposes only and do not limit the invention. It is to be appreciated that those skilled in the art can change or modify the embodiments without departing from the scope and spirit of the invention.

What is claimed is:

1. A turntable device for detachably securing a disk, the turntable device comprising:
   a centering part having a plurality of slots formed in an inner perimeter thereof along a circumferential direction, the slot configured to provide an elastic force;
   a base having a conical extension part formed thereon, the conical extension part configured to slidably support an inner perimeter of the centering part; and
   a yoke coupled to an upper end of the base, the yoke configured to limit the sliding of the centering part and prevent the centering part of detaching,
   the centering part comprising
      an inner perimeter part having an inner perimeter surface of a conical shape corresponding to an outer perimeter surface of the conical extension part, and including a plurality of supports parts formed by the slots, and
      an outer perimeter part positioned at an outer side in a radial direction of the conical extension part, and securing the disk mounted on the base,
   wherein the support parts press the conical extension part inward such that the centering part rises along the outer perimeter surface of the conical extension part.

2. The turntable device of claim 1, wherein a holding part is formed on the base, the holding part having the centering part held therein.

3. The turntable device of claim 1, further comprising:
   an elastic member coupled to the base, the elastic member configured to elastically support the centering part.

4. The turntable device of claim 3, wherein the elastic member is a compression coil spring or a rubber ring.

5. The turntable device of claim 1, wherein an outer perimeter of the centering part comprises a plurality of adjoining convexly curved surfaces.

6. The turntable device of claim 5, wherein the plurality of convexly curved surfaces comprises:
   a first convexly curved surface configured to guide a mounting of the disk; and
   a second convexly curved surface configured to touch an inner perimeter of the disk to secure the disk.

7. The turntable device of claim 6, further comprising:
   a third curved surface interposed between the first and second convexly curved surfaces and connecting the first and second convexly curved surfaces.

8. The turntable device of claim 1, wherein the centering part includes a concave portion between the inner perimeter and an outer perimeter of the centering part, and
   an additional elastic member is placed within the concave portion, the additional elastic member being a rubber coil and o-ring.

9. A disk driving device for driving a disk, the disk driving device comprising:
   a centering part having a plurality of slots formed in an inner perimeter thereof along a circumferential direction, the slot configured to provide an elastic force;
   a base having a conical extension part formed thereon, the conical extension part configured to slidably support an inner perimeter of the centering part;
   a yoke coupled to an upper end of the base, the yoke configured to limit the sliding of the centering part and prevent the centering part from detaching; and
   a motor configured to transfer a driving force to the base, the centering part comprising
      an inner perimeter part having an inner perimeter surface of a conical shape corresponding to an outer perimeter surface of the conical extension part, and including a plurality of support parts formed by the slots, and
      an outer perimeter part positioned at an outer side in a radial direction of the conical extension part, and securing the disk mounted on the base,
   wherein the support parts press the conical extension part inwards such that the centering part rises along the outer perimeter surface of the conical extension part.

10. The disk driving device of claim 9, wherein a holding part is formed on the base, the holding part having the centering part held therein.

11. The disk driving device of claim 9, further comprising:
    an elastic member coupled to the base, the elastic member configured to elastically support the centering part.

12. The disk driving device of claim 11, wherein the elastic member is a compression coil spring or a rubber ring.

13. The disk driving device of claim 9, wherein an outer perimeter of the centering part comprises a plurality of adjoining convexly curved surfaces.

14. The disk driving device of claim 13, wherein the plurality of convexly curved surfaces comprises:
   a first convexly curved surface configured to guide a mounting of the disk; and
   a second convexly curved surface configured to touch an inner perimeter of the disk to secure the disk.

15. The disk driving device of claim 14, further comprising:
   a third curved surface interposed between the first and second convexly curved surfaces and connecting the first and second convexly curved surfaces.

16. The disk driving device of claim 9, wherein the centering part includes a concave portion between the inner perimeter and an outer perimeter of the centering part, and
   an additional elastic member is placed within the concave portion, the additional elastic member being a rubber coil or o-ring.

* * * * *

UNITED STATES PATENT AND TRADEMARK OFFICE
CERTIFICATE OF CORRECTION

PATENT NO. : 8,424,033 B2  
APPLICATION NO. : 12/081599  
DATED : April 16, 2013  
INVENTOR(S) : Viatcheslav Smirnov et al.

Page 1 of 1

It is certified that error appears in the above-identified patent and that said Letters Patent is hereby corrected as shown below:

In the Claims

Column 7, Line 61, In Claim 1, delete "slot" and insert -- slots --, therefor.

Column 7, Line 67, In Claim 1, delete "of" and insert -- from --, therefor.

Column 8, Line 5, In Claim 1, delete "supports" and insert -- support --, therefor.

Column 8, Line 10, In Claim 1, delete "inward" and insert -- inwards --, therefor.

Column 8, Line 38, In Claim 8, delete "and" and insert -- or --, therefor.

Column 8, Line 43, In Claim 9, delete "slot" and insert -- slots --, therefor.

Signed and Sealed this  
Twenty-fourth Day of September, 2013

Teresa Stanek Rea  
*Deputy Director of the United States Patent and Trademark Office*